United States Patent [19]

Raychaudhuri

[11] Patent Number: 4,504,946
[45] Date of Patent: Mar. 12, 1985

[54] TIME DIVISION MULTIPLE ACCESS COMMUNICATION SYSTEMS

[75] Inventor: Dipankar Raychaudhuri, Kendall Park, N.J.

[73] Assignee: RCA Corporation, New York, N.Y.

[21] Appl. No.: 387,366

[22] Filed: Jun. 11, 1982

[51] Int. Cl.³ .............................................. H04J 6/02
[52] U.S. Cl. ...................................... 370/95; 370/104
[58] Field of Search ..................... 370/95, 93, 80, 85, 370/104; 340/825.51

[56] References Cited

U.S. PATENT DOCUMENTS

| | | | |
|---|---|---|---|
| 3,603,739 | 9/1971 | Edson | 370/95 |
| 3,644,678 | 2/1972 | Schmidt | 370/95 |
| 3,649,764 | 3/1972 | Maillet | 370/95 |
| 3,680,051 | 7/1972 | Blessin et al. | |
| 3,683,116 | 8/1972 | Dill | 370/95 |
| 3,825,691 | 7/1974 | Honma et al. | 370/93 |
| 4,126,764 | 11/1978 | Downey et al. | |
| 4,151,373 | 4/1979 | Widmer et al. | |
| 4,158,107 | 6/1979 | Nicholas | |
| 4,383,315 | 5/1983 | Torng | 370/93 |

FOREIGN PATENT DOCUMENTS

| | | | |
|---|---|---|---|
| 152903 | 12/1979 | Japan | 370/95 |
| 111369 | 9/1981 | Japan | 370/95 |

Primary Examiner—Douglas W. Olms
Assistant Examiner—Wellington Chin
Attorney, Agent, or Firm—Joseph S. Tripoli; Robert L. Troike

[57] ABSTRACT

An improved time division multiple access (TDMA) satellite transmission system uses N TDMA stations and employs a signal format in which successive time frames begin with a header containing synchronizing and control signals generated by a selected TDMA and followed by N time slots, and in which each TDMA station generates and transmits data packets having a high energy level during a unique time slot assigned to each TDMA and in which each TDMA transmits data packets only during its assigned time slot, and further in which at least some of the TDMA's do not transmit data packets in the available time during the assigned time slot, thereby leaving unpredictably occurring idle time. Apparatus is provided for using a substantial portion of the idle time. The apparatus includes a plurality of random access terminals (RATS) each constructed to generate and transmit a data packet, having a lower energy level then the TDMA energy level, to any given single time slot during each frame and logic apparatus is provided for selecting such given single time slot on a predetermined statistical basis. Each RAT is capable of receiving all successfully transmitted data packets and determines the successful or non-successful transmission of any data packet originating therefrom. Data is retransmitted by the RAT's during a subsequent frame when the originally scheduled RAT transmission is not successfully completed.

8 Claims, 7 Drawing Figures

TIME DIVISION MULTIPLE ACCESS COMMUNICATION SYSTEMS

This invention relates generally to communications systems and more particularly to a technique for using idle time slots in time division multiple access systems.

In a time division multiple access (TDMA) system, a single wide band channel is time shared by N TDMA transmit stations. In the time domain the channel is partitioned into a sequence of time frames each frame consisting of N signed transmission intervals or time slots. Each of the N transmission stations is assigned to a given time slot in the frames and each station generates a queue of data packets which are transmitted one by one during the time slot assigned to the particular transmit station in each frame. In order to prevent queing delays for data packets transmitted over such a transmission link, the traffic intensity (fraction of occupied time slots) has to be lower than 0.8 or 0.9. This implies that in a typical TDMA system, 10–20% of the slots available for transmission will be unused. However, due to the random nature of the transmission it is not possible to predict in advance which of the slots will be idle.

The present invention employs a technique which utilizes idle slots in a TDMA system for transmission from a plurality of small low level power terminals to a large central station and thus make a more efficient use of the single wide band time shared channel. The principle of the present invention is to permit the small terminals to transmit in the TDMA slots at low power levels in a random access mode (ALOHA) as opposed to an assigned time slot mode. The term ALOHA is commonly used in the art to describe the random access mode of time slot utilization in a radio or satellite transmission system.

In accordance with a preferred form of the invention there is provided, in a time division multiple access (TDMA) communication system comprising N TDMA stations and employing a signal format in which successive time frames begin with a header containing synchronizing and control signals generated by a selected TDMA and followed by N time slots, and in which each TDMA station generates and transmits data packets having a high energy level greater than X during a unique time slot assigned to each TDMA and in which each TDMA transmits data packets only during its assigned time slot, and further in which the TDMA's do not transmit data packets in every available assigned time slot, thereby leaving unpredictably occurring idle time slots, a circuit for using a substantial portion of the idle time slots comprising a plurality of random access terminals (RATs) each constructed to generate and transmit a data packet having an energy level less than Y to any given single time slot during each frame and logic for selecting such given single time slot on a predetermined statistical basis, and where X is sufficiently greater than Y so that a data packet transmitted from a TDMA will completely obscure a data packet transmitted from a RAT. Each RAT comprises receiving means for receiving all successfully transmitted data packets and for determining the successful or non-successful transmission of any data packet originating therefrom, and logic for retransmitting such non-successfully transmitted data packets during subsequent frames.

Before describing in detail the structures shown in the figures, certain basic principles employed in the invention will be set forth to enable the reader to better understand the figures. In the overall system there is employed a number of TDMA units 100, 102 and 104 each of which is assigned to a particular time slot in a frame. A frame, illustrated in FIG. 1, consists of a frame header 114, which contains among other things, synchronizing information and N time slots 116 each of which has assigned to it one of the TDMA units such as 100. A subsequent frame consists of a frame header 118 followed by N time slots 120. The frames are time synchronous and the same time slot in each frame is assigned to the same TDMA unit.

Figure 1:
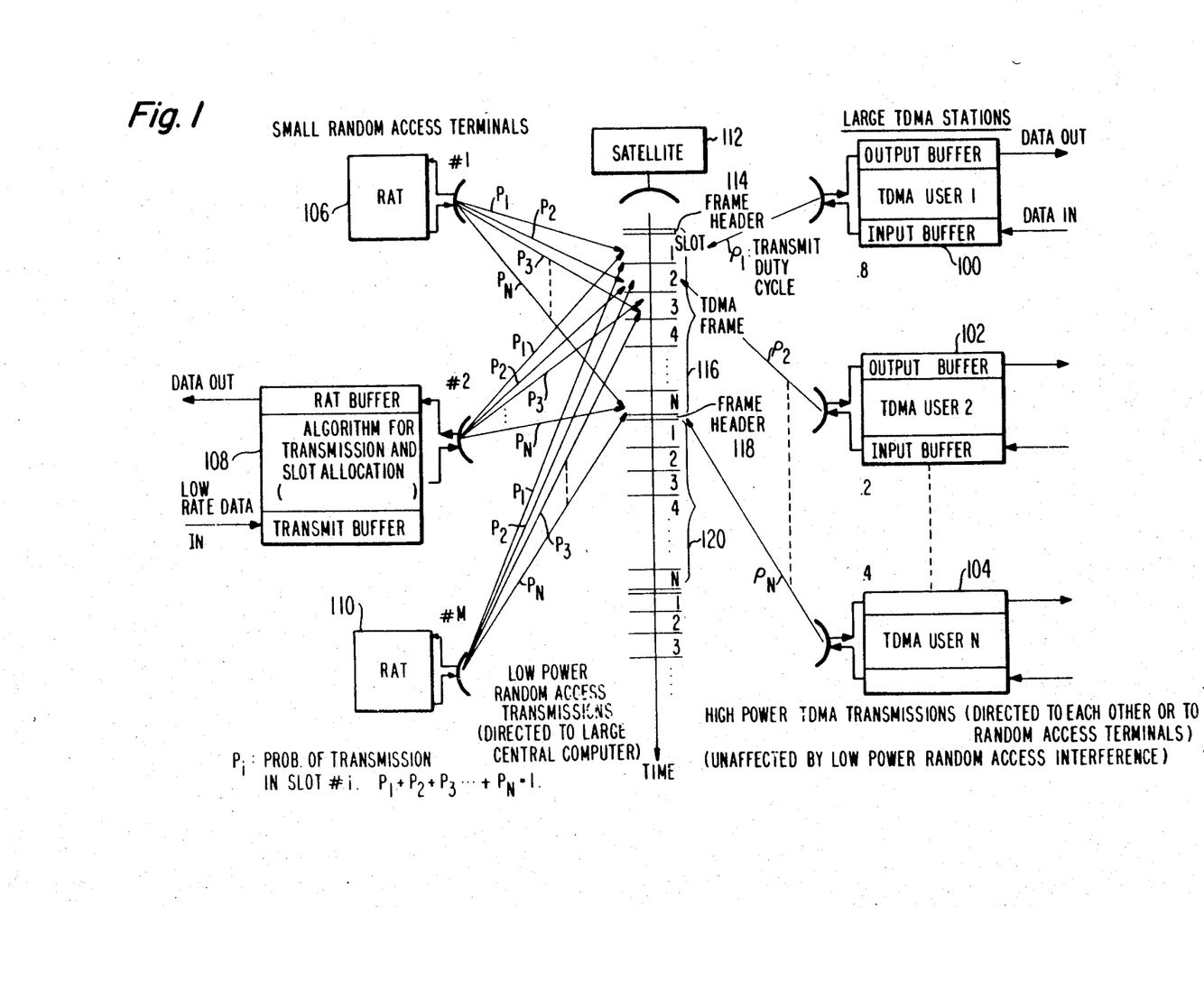
FIG. 1 is a block diagram of the architecture of the overall system.

Each of the TDMA units generates and transmits packets of data referred to herein as TX data packets. The TDMA units also receive data packets which are transmitted from any other source during the same time slot. It is to be noted that in a strictly defined TDMA system the only data packets that would occur during a given time slot would be from the TDMA unit assigned to that time slot.

However, as indicated above, the TDMA units do not necessarily transmit a data packet each time their corresponding assigned time slots occur. Therefore, in some frames no data packets are provided from one or more of the TDMA units. The rate or the frequency with which any given TDMA unit transmits data packets to its time slot is called the traffic intensity, which is equivalent to the probability of occurrence. Thus, for example, if over a sequence of 100 frames TDMA 100 transmitted data packets 80 times, (i.e., during 80 frames) then, the probability of occurrence of a data packet in that assigned time slot would be 80% or 0.8.

Over the same sequence of 100 frames, TDMA unit 102 might have only transmitted 20 data packets so that the probability of occurrence for its assigned time slot (#2) would be 20% or 0.2.

For the same sequence of 100 frames, TDMA unit 104 might have generated only 40 data packets so that the probability of occurrence or traffic intensity of time slot N would be 40% or 0.4.

Thus, the time slots, such as 1, 2 and N in FIG. 1, are respectively, empty or idle 20%, 80% and 60% of the time during the specified 100 frames. It is possible for other equipment to transmit information during these idle time slots one form of such other equipment is shown to the left of FIG. 1 and is designated as small random access terminals (RATs) 106, 108 and 110. Each of these RATS can transmit in any time slot in any frame as determined by logic within the RAT on a predetermined statistical basis. Specifically, each of the RATS has logic therein, which will be described later, which receives every data packet occurring in every time slot in every frame. From this information the logic in the RAT computes or determines the probability of occurrence or traffic intensity of each time slot for each successive 100 frames. Based on the traffic intensity of the previous 100 frames each RAT will then transmit to selected time slots in the next 100 frames.

It might be mentioned at this point that the data packets generated by the RATS are at a much lower power level than those transmitted by the TDMA units. If transmission occur from both TDMA terminals and RATs, the TDMA packet will prevail and the much lower power data packet from the RAT will be lost. However, the RAT does contain logic which will receive the signal prevailing during that particular time slot and will make a determination whether such signal or data packet was the one that the RAT transmitted or was another signal. Then the RAT will reschedule its data packet and transmit it in a later frame, possibly in a different time slot. The retransmission of a data packet from a RAT will occur any time the signal received back by the RAT is not determined to be exactly like the data packet that it transmitted. Such alterations of the transmitted data packet from a RAT can occur for reasons other than conflict with a data packet transmitted by a TDMA in the same time slot.

Consider further the statistical means or theory by which a RAT selects a time slot. One way for a RAT to select a time slot is simply on a random basis with each slot having an equal chance of being selected by each RAT and each RAT selecting its time slot completely independently of all other RATS. However, such a system does not take into account the fact that some time slots will have lower probabilities of occupancies than others. In the example discussed above (with N=3) where time slots 1, 2 and 3 have probabilities of occupancy of 0.8, 0.2 and 0.4, respectively, it is apparent that time slot 2 can be used by one of the RATS four times as much as the time slot 1 which has a probability of occupancy of 0.8 and 4/3 times as much as time slot 3 which has a probability of occupancy of 0.4.

However, if all the RATS having determined that time slot 2 had the least probability of occupancy transmitted into slot #2, then slot 2 would soon have high RAT traffic and would probably become overloaded. Thus, any given RAT would have the greatest chance of throughput, that is finding an empty slot by accessing slots in proportion to their available capacity. That is, for example, in 8 attempts to transmit a data packet it would be desirable to attempt to access time slot 2 the first four times, time slot 3 the next three times and time slot 1 once. Each of the RATS in fact will select slots on such a basis, with the order of selecting the time slots 1, 2 and 3 being independently and randomly determined by each RAT. After each sequence of 100 frames the probabilities of occurrence are recalculated by logic within the RATS so that for the following 100 frames the RATS will direct their data packets at time slots which can be different from the previous 100 frames depending upon the change of probability of occupancy of the time slots.

As the traffic load from the RATS increases, however, the available idle time slots become more crowded with such traffic until they approach a point of overload at which time the probability of occurrence of one or more of the time slots approaches unity. This is a non-desirable situation because there is no way of knowing how many data packets are lined up or queued up to be transmitted via the fully loaded time slot. It is thus desirable to take some action to lower the traffic on those particular time slots having the above type of RAT congestion.

Figure 2:
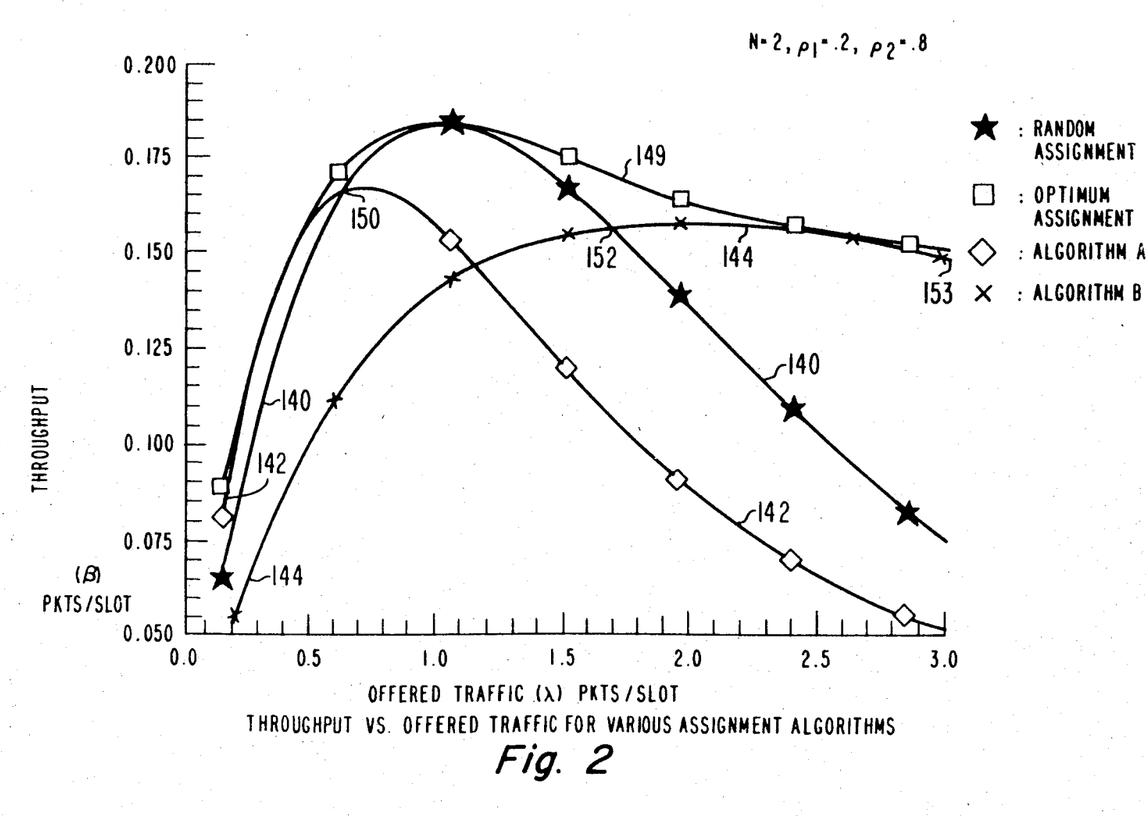
FIG. 2 shows operating curves of data packet throughput vs. data packets offered for various statistical methods of assigning time slots.

In FIG. 2 the four curves 140, 142, 144 and 149 show various data packet throughputs vs. data packets offered for using different predetermined statistical methods of selecting time slots. Curve 149 is the ideal or optimum curve not practically obtainable. Curves 140, 142 and 144 are obtainable using algorithms A and B shown in blocks 270 and 274 of FIG. 6 and a random approach shown in block 272 of FIG. 4. The best result is obtained from a combined use of algorithms A and B and the random approach with switching from one method to another being made on the basis of traffic intensity as will be discussed below.

Curve 142 in FIG. 2 shows the throughput vs. intensity of offered traffic for the system of FIG. 1 where a particular assignment technique (algorithm A) is utilized. It can be seen that as the traffic increases the throughput decreases to the point where data is being lost or querred up to an unsatisfactory degree.

Curve 140 of FIG. 2 shows the throughput vs. intensity of offered traffic for a random assignment of the time slots for the RATS as discussed briefly above. It can be seen that the throughput for the random assignment technique (curve 140) of selecting time slots by the RATS is rising at point 150 whereas at that same point 150 the throughput resulting from the use of algorithm A, that is curve 142, begins to drop off.

Figure 5:
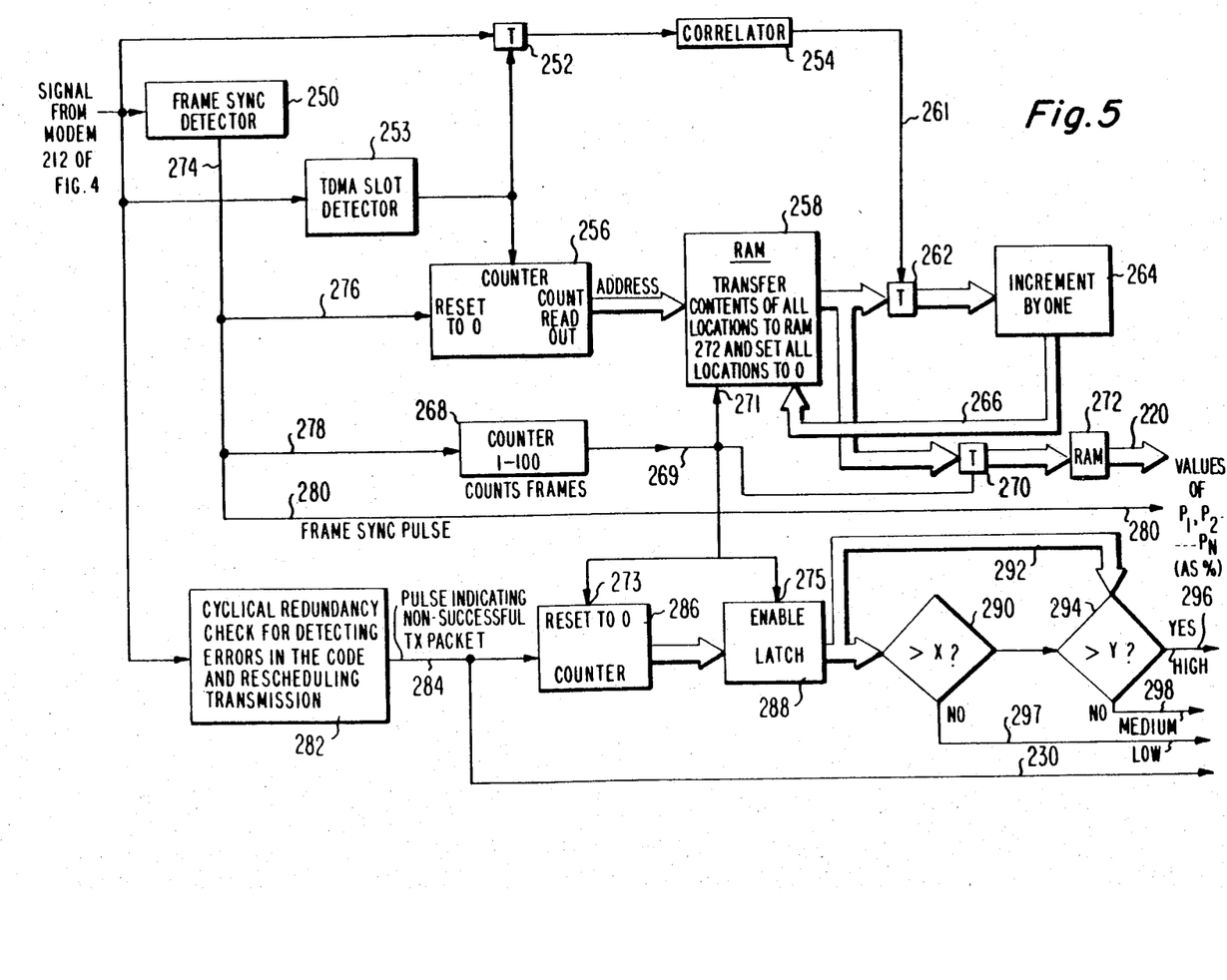
FIG. 5 is a another block diagram of a portion of a RAT employed in the system.

Accordingly, there is logic within the RATS as shown and discussed in FIG. 5 which detects the point 150 in terms of failed data packets from each RAT and changes its technique of selecting a time slot from algorith A to the random assignment shown in curve 140 of FIG. 2.

Curve 144 represents a different statistical approach for selecting time slots by the RATS and is identified as algorithm B as indicated at the right of the chart of FIG. 2. It can be seen that at point 152 the throughput resulting from the use of random assignment as indicated by curve 140 intersects and drops below the throughput that can be obtained by the use of algorithm B as indicated by curve 144.

Figure 6:
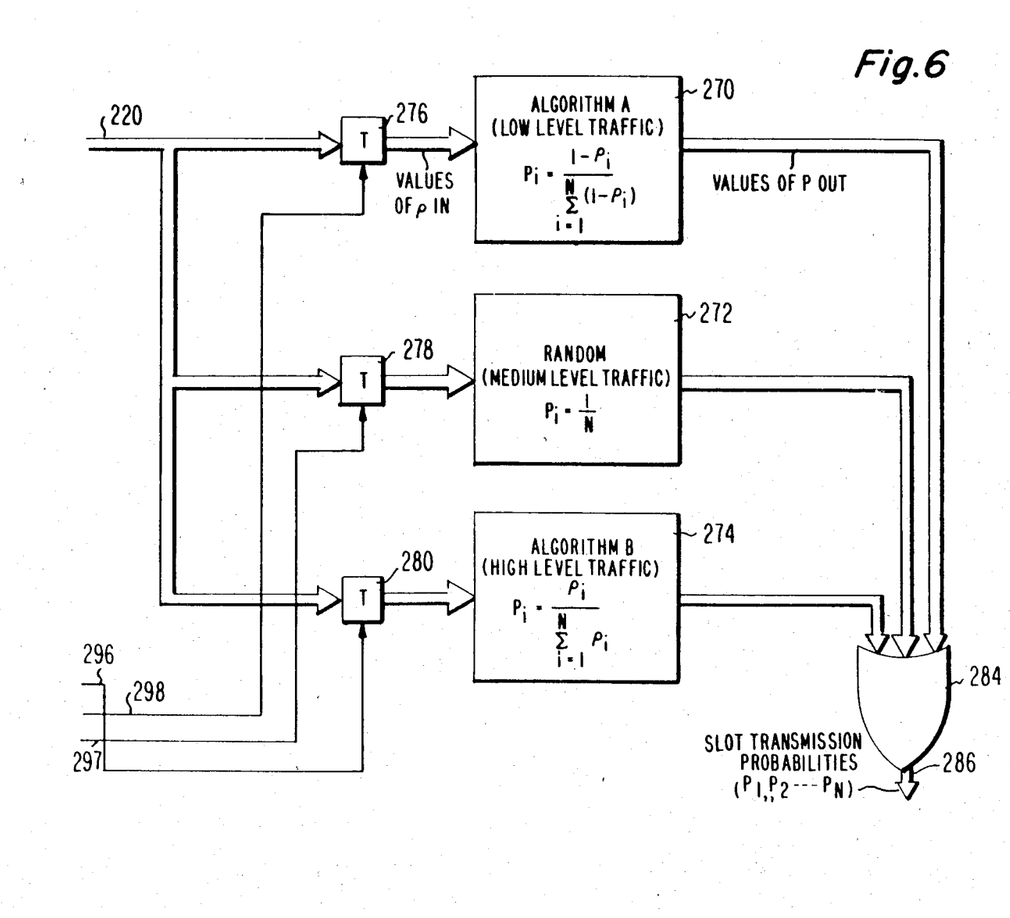
FIG. 6 is yet another logic diagram of a portion of a RAT employed in the system.

Accordingly, the RATS each contain logic which determines point 152 from the data that particular RAT has collected and changes its selection of time slots to a method based on algorithm B rather than the random assignment. The logic for making such determination is shown in FIGS. 5 and 6. While the logic for implementing algorithm B is shown in FIG. 6 it might be pointed out here that algorithm B is basically one which is the inverse of algorithm A. More specifically, when the offered traffic becomes very high, it means that time slots selected by a RAT based on either random assignment or algorithm A causes in most of the time slots to acquire probabilities of occupancies near 1. The theory of the use of algorithm B is to take those time slots which have the highest probability of occupancy and have the RATS select such time slots with the most frequencies and to select those time slots having the least probability of occupancy with the least frequency. Thus, in the example, discussed above in connection with algorithm A, time slot 1 would be selected the most and more specifically, 4 times as often as time slot 2 and twice as often as time slot 3. Thus, in effect, the system has determined that traffic is too large to handle and some of it must be in effect, not be handled. To achieve this, RATs select the slots with the highest probability of occupancy most of the time and the data packets supplied to such time slots are, of course, not successfully transmitted by the system. However, the data packets supplied to those time slots having lower probability of occupancy will successfully get through the system since those time slots in all likelihood will not become overcrowed.

Figure 3:
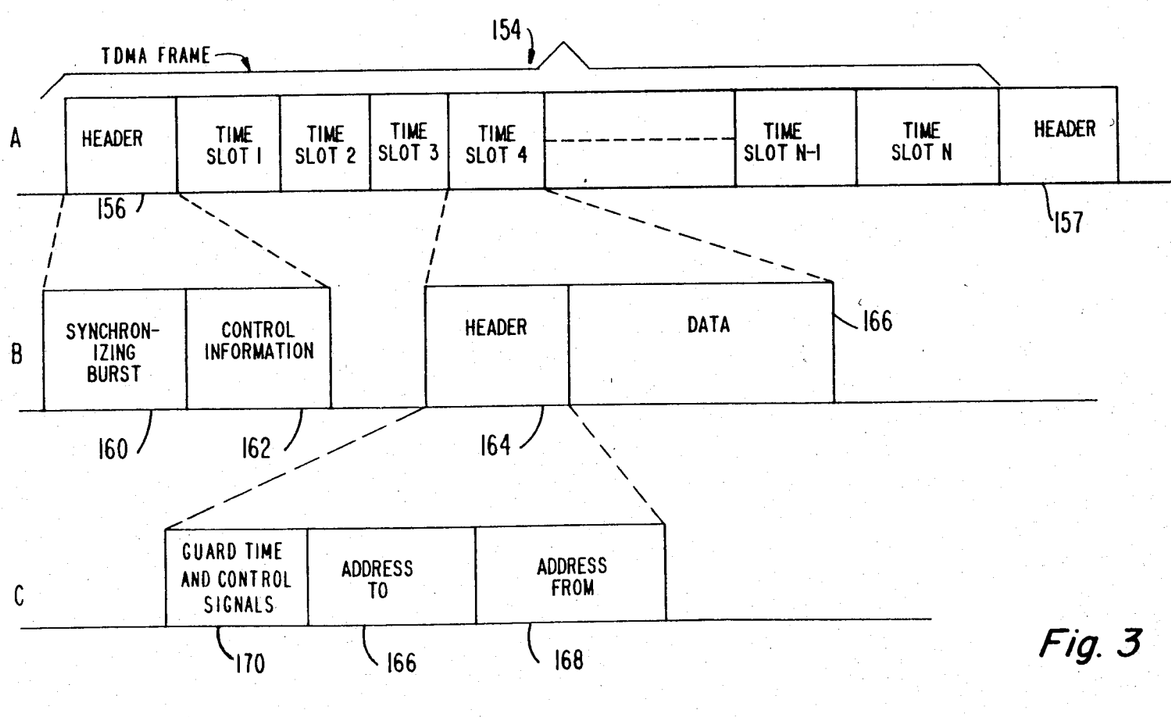
FIG. 3 shows the format of the signals employed in the system.

Referring now to FIG. 3, there is shown the format of the data packet signals employed in the system. In FIG. 3a there is shown a bar waveform of a repetitive frame format which could be supplied either from a TDMA or a RAT and where each frame comprises a header such as 156 followed by a succession of N time slots. Header 157 marks the beginning of the next frame followed by another succession N time slots. The header 156 is shown in somewhat expanded form in the bar waveform 3B and can be seen to consist of a burst of synchronizing pulses 160 followed by control information 162 which can include anything desired in the particular header generated. The particular control information is not part of the invention and will not be described further.

The time slots such as time slot 4 of FIG. 3a is divided into a slot header 164 and a data portion 166 as shown in FIG. 3b. The slot header 164 in turn is comprised of an address TO, and, an address FROM portion 166 and 168, respectively, preceeded by additional control information including sync signals unique to that particular time slot as shown in FIG. 3C. The address TO and address FROM portions 166 and 168 refer specifically to the destination of the data packet which can either be a RAT or TDMA unit and the address FROM portion 168 designates the source of the data packet which can be either a RAT or a TDMA unit.

Figure 4:
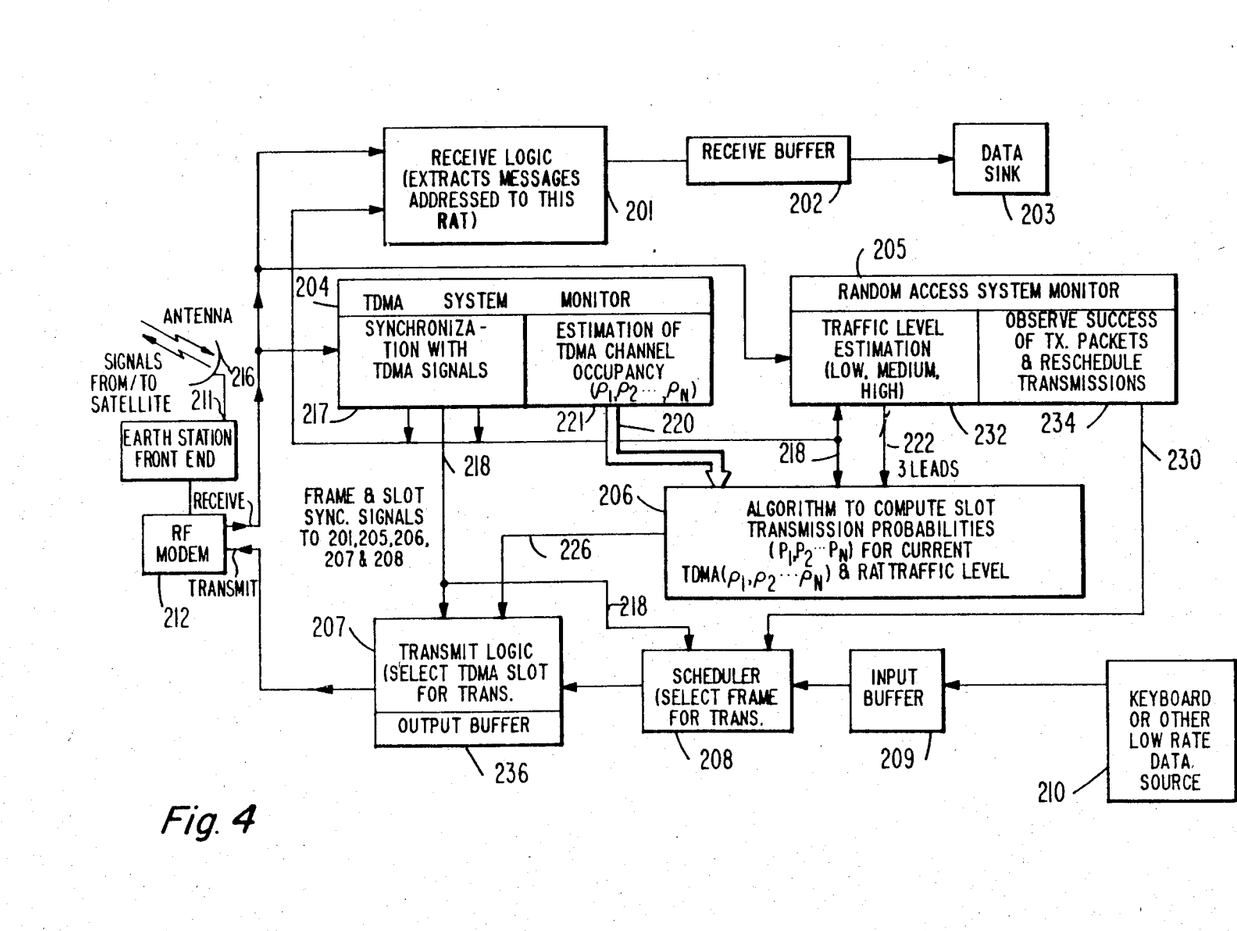
FIG. 4 is a logic diagram of a portion of a RAT employed in the system.

Referring now to FIG. 4 there is shown a general architecture for one of the RATS of FIG. 1 such as RAT 106 or RAT 108. In FIG. 4, the data package is transmitted from and received by the RAT of FIG. 4 using the antenna 216. Receive signals are supplied to an earth station front end 211 which contains the appropriate equipment to receive the incoming radio frequency signal. The equipment in 211 includes a receive filter, a low noise amplifier and a mixer for frequency conversion. The received signal is then passed through an RF modem 212 where it is translated or demodulated to recover the data. The data is supplied to receive logic 201 which extracts the messages addressed to this particular RAT and supplies those particular messages to a receive buffer 202. The output of the buffer 202 is supplied to a data utilization means 203.

In FIG. 4, data packets are generated by a keyboard or other low rate source 210 and supplied to an input buffer 209. A scheduler under the control of timing pulses from synchronization signal source 217 via lead 218 and a control signal supply from unit 234 via lead 230 schedules the data packet with respect to a given frame for transmission of the data packet. Such information is supplied to the transmit logic 207 which transmits the data packet via RF modem 212 and the front end 211 and then from antenna 216 of the earth station.

The scheduler 208, the transmit logic 207 and the algorithm logic 206 will be discussed in detail later herein in FIGS. 5, 6 and 7. At this time it is sufficient to say that the algorithm logic 206 responds to signals from logic blocks 204, the TDMA system monitor, and 205, The RAT system monitor, to compute the slot transmission probabilities for the current TDMA and RAT traffic level.

After a packet is transmitted from a RAT such transmitted signal will remain stored in the output buffer 236 until it is received back at a later time and examined by other logic, namely, that within block 205 to determine if the transmitted packet was, in fact, successfully transmitted. If the TX packet was successfully transmitted, then a signal is sent to the scheduler 208 instructing it to receive the next data packet from input buffer 209 for subsequent transmission. If the TX packet in question was not successfully transmitted, then a signal indicating this situation is supplied to the schedule 208 via lead 230. This signal instructs the scheduler to to reschedule the same TX packet for transmission in a time slot in a subsequent frame determined by random means to be described later, and then instruct 208 to retransmit the TX packet in the selected time slot of the subsequent frame.

The receive logic 201 functions under control of frame and slot sync signals from logic block 217 to receive all data packages appearing in the system and extracting those messages which are addressed to the particular RAT terminal shown in FIG. 4. The receive logic 201 contains correlation means which identifies a given received TX packet address to the particular RAT of FIG. 4.

The receive buffer 202 receives or stores the selected message temporarily and then supplies it at the proper time to data utilization means 203.

Referring now to FIG. 5 there is shown a more detailed block diagram of one portion of the RAT mainly the logic within the blocks 204 and 205 of FIG. 4. In FIG. 5 the signal from the RF modem 212 of FIG. 4 is supplied to the frame sync detector 250 where the frame synchronizing pulses as shown in bar waveform 160 of FIG. 3b are extracted and supplied to the input of counters 256, 268, and to the output lead 280 via the output lead 274 FROM frame sync detector 250. The TDMA slot detector is also responsive to the signal from the modem 212 of FIG. 4 to output pulses defining each of the time slots of each frame.

The counter 256 responds to the output of TDMA slot detector 253 to count the slots in each frame from one through M and output such count as an address to the input of RAM 258 which contains the proper decoding means for the count supplied from counter 256. As each word location in RAM 258 is accessed from 1 through M it is supplied to a transmission gate 262 and also to a transmission gate 270. As the N storage locations in RAM 258 are accessed by the output of counter 256, the correlator 254 correlates the incoming packet and more specifically analyzes the incoming packet to determine if a transmitted TDMA packet did in fact occur in the time slot being analyzed. If it did, then transmission gate 262 is energized via a correlation pulse on output lead 261 to pass the output of RAM 258 which contains the address location of the time slot containing the TDMA packet to an Increment By One logic unit 264. Unit 264 will increment the output of RAM 258 by one and supply the incremented signal back to RAM 258 in the same word location from which it was derived. Thus, that particular word location indicates that one more packet has been received during a given 100 frames and in that time slot.

This process of incrementing by one of course occurs for each of the N word locations in RAM 258, which correspond to each of the N TDAM slots.

The end of 100 frames is measured by counter 268 in response to the frame sync pulses from detector 250. The output pulse is supplied to RAM 258 via leads 269 and 271 to transfer the contents of all the locations of the RAM 258 to the RAM 272 in corresponding word locations and to set all locations in RAM 258 to 0 thereby beginning a new cycle of counting successively received packets for the next 100 frames. Occupancy of a time slot occurs even though the packet has been distorted by noise or by collision with another packet. It is also, however, necessary to determined if a packet sent by the RAT of FIG. 4 and FIG. 5 was successfully transmitted. This is determined by logic including cyclical redundancy check logic 282 and the logic within blocks 286, 288, 290 and 294 in the following manner.

As each transmitted packet is received, it is checked in the cyclically redundancy check logic of block 282 to detect errors in the code and also to effect the rescheduling of a transmission of a packet for an unsuccessful transmission.

The specific logic indicated in block 282 is well known in the art and can be found on pages 462–466 of a publication entitled "Digital Communications by Satellite," V. K. Bhargava, et al. published by Wiley in 1981. If the transmission was successful from the RAT described in FIGS. 4 and 5, then a pulse so indicating which can be a high level signal appears on output lead 284 to cause the counter 286 to increment by one. Since checking is done in groups of 100 frames by virtue of counter 268, counter 286, over such 100 frames, will register all of the successful transmissions from the RAT described in of FIG. 5 thereby directly providing a measure of the percentage of successful RAT transmissions for that particular RAT.

Also at the end of each 100 frames, the latch 288 is enabled via leads 269 and 275 to supply the contents of the counter 286 to a decision making circuit 290 where the contents of the counter 286 are compared with a value X. Now X is a somewhat arbitrary value which is selected to define a traffic level lower than point 150 on the curve 142 of FIG. 2 which is at that portion of the operating characteristic of the system which requires algorithm A as discussed above. Algorithm A will be discussed later in connection with FIG. 6.

Thus, if the content of counter 286 is less than X there is an output signal on lead 297 which indicates that the system must operate in the low portion of the curve of FIG. 2, that is, that portion to the left of point 150.

On the other hand, if the value of counter 286, and of course latch 288, is greater than X then the value of counter 286 at the end of 100 frames is compared with a value Y which defines that traffic level of traffic intensity between the points 150 and 152 of the curve of FIG. 2, which is a medium level of traffic and is indicated by an output on the output terminal 298 of decision logic 226.

If the value in the counter 286 at the end of 100 frames is greater than Y, then there will a signal supplied to output 296 from decision circuit 294 indicating that the traffic level is high and the circuit must operate in the upper third of the curve extending from point 152 to the point 153 and utilizing the curve 144 which is obtained by algorithm B as discussed above and discussed below in FIG. 6.

Referring now to FIG. 6, there is shown a more detailed logic of block 206 of FIG. 4. The apparatus of FIG. 6 is connected to the apparatus of FIG. 5 via bus 220 and leads 296, 298 and 297 which have similar numbering in both figures. The function of FIG. 6 is primarily one of selecting the logic performing or implementing algorithm A indicated in block 270 or for selecting a random technique for assigning time slots as indicated in block 272 or the method of algorithm B for assigning the time slots, for the RATS such as the RAT of FIG. 4, as indicated in block 274. Specifically, the three transmission gates 276, 278, and 280 are enabled respectively, by the signals appearing on leads 296, 298 and 297 which, as discussed relative to FIG. 5, select the algorithm suited for low level RAT traffic, a medium level of RAT traffic or high level RAT traffic, respectively. The outputs of logic blocks 270, 272 and 274 are supplied through an OR gate 284 as slot transmission probabilities to the input bus 286 of the scheduling and transmit logic shown in FIG. 7 and which corresponds to the scheduling and transmit logic 208 and 207 of FIG. 4.

In FIG. 6 each of the logic blocks 270, 272 and 274 can be in the form of a ROM. More specifically, the contents of each memory location of the ROM in block 270 are formed as follows. $P_I$, which is a probability of RAT transmission for a given time slot I in the selected frame is given a value and then the computation made in accordance with the expression within the block 270. The values of $\rho_i$ on the bus 220 select an address in the ROM which contains the corresponding set of values of $P_i$, calculated on the basis of algorithm A.

Similarly, a ROM whose contents are calculated by the expression 1/N can be used the logic of block 272 by having each of the memory locations contain a value equal to 1/N where N is the designation of the time slot.

The ROM presented by block 274 has the contents determined by the evaluating the expression to the right of the equal sign after setting I to some given value and then calculating P. The value P, of course, is the above-defined channel occupancy and is determined by the logic within block 221 of FIG. 4.

Figure 7:
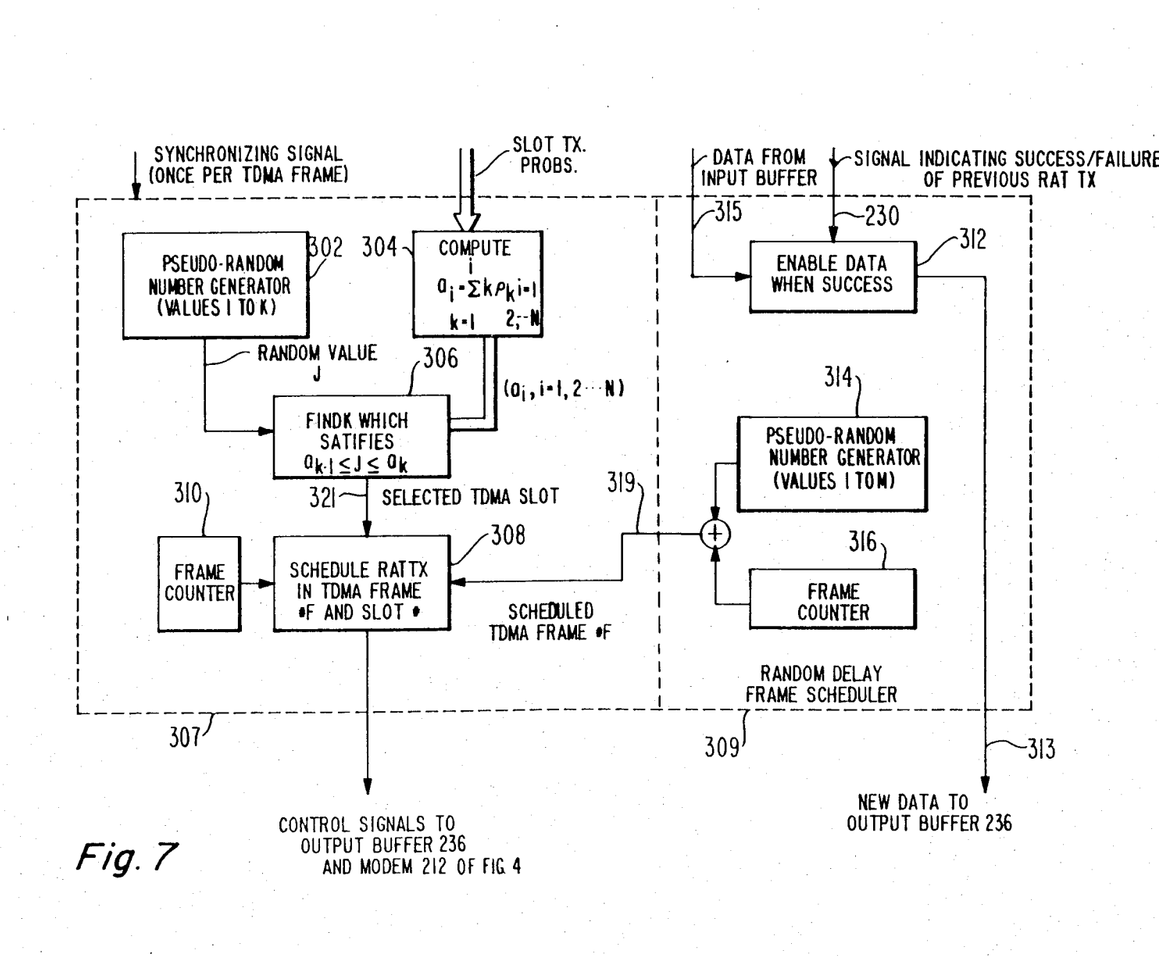
FIG. 7 is still another diagram of a portion of a RAT employed in the system.

Referring now to FIG. 7 there is shown apparatus within block 307 for selecting the frame and slot for each transmitted data packet from the RAT of FIG. 4. The logic within the dashed line block 309 of FIG. 7 functions to output a new data TX packet when the previous one was successfully transmitted and also to generate a pseudo random number for determining the next frame in which a TX packet is to be transmitted to this particular RAT.

Referring now specifically to the logic within block 307, the logic 304 which can be a ROM receives the slot transmission probabilities $P_1$, $P_2$—$P_N$ from the output of the OR gate 284 of FIG. 6. The memory locations of the ROM represented by block 304 contain the computations to the right of the equal sign of the expression within block 304 for various values of P, which are input as address lines to the ROM, in much the same manner as described in connection with the ROMS 270, 272 and 274 of FIG. 6.

The values of $a_1$, $a_2$—$a_N$ are supplied to a bank of comparators 306. Also supplied to a bank of comparators is the output of pseudo random number generator 302 which will generate a random value J, uniform over 1 to K, for each transmission for each frame. In block 307 the modules or the logic elements 302, 304 and 306 implement the random selection of a TDMA slot in the frame chosen for transmission. More specifically, it is desired to choose one out of the N time slots in accordance with the probabilities $P_1$, $P_2$, $P_3$—$P_N$ supplied from the output of OR gate 284 on line 286. In order to accomplish this, a random number J is generated in pseudo random number generator 302 and compared against the appropriate set of numbers $a_1, a_2, a_3—a_N$ generated in logic 304. If the value of J lies between $a_{K-1}$ and $a_K$ then slot number K is selected as the TDMA slot for transmission. The numbers $a_1, a_2, a_3—a_N$ are obtained from $P_1, P_2, P_3—P_N$ as follows:

$$a_1 = KP_1$$

$$a_2 = K(P_1 + P_2)$$

$$a_2 = K(P_1 + P_2 + P_3)$$

$$a_N = K(P_1 + P_2 + P_3 — P_N)$$

It can be verified using elementary probability theory that the results generated by the operations described above will achieve a choice of TDMA slots consistent with the probabilities $P_1, P_2,—P_N$. The logic 302 can be implemented as a standard shift register pseudo random generator with feedback. The logic block 304 can be implemented with a ROM and the logic 306 as a parallel bank of comparators. Finally, the logic within block 308 generates control signals required for transmission in the selected frame F and the selected slot K.

Referring now to the apparatus within the block 309, the logic block 312 responds to the output of the cyclically redundancy check logic 282 of FIG. 5 which indicates the success or failure of the prior RAT TX. If the backup previous TX data packet was a success the enable data block 312 outputs a signal on its output lead 313 which goes to the scheduler 208 of FIG. 4 to authorize or to instruct the system to supply new data from input buffer to output buffer 236 of FIG. 4. Such new data, in fact, enters the enable data block 312 via lead 315 from input buffer 209 of FIG. 4 and then is supplied to the scheduler 208 of FIG. 4. In other words, block 312 acts as a switch or a transmission gate for new data to be supplied to the scheduler 208 from the input buffer 209.

The pseudo random number generator 314 functions in cooperation with a frame counter 316 and the addition gate 317 to supply a signal to the scheduler 308 via lead 319 indicating the next frame in which a TX packet is to be transmitted.

The scheduler 308 responds to the frame scheduling signal receive via lead 319 and the selected TDMA slot received via lead 321 to output control signals indicating such selected TDMA frame and slot numbers to output buffer 236 and modem 212 of FIG. 4. The next TX packet will then be transmitted during such designated frame and time slot.

What is claimed is:

1. In a time division multiple access (TDMA) communication system, a plurality of TDMA stations each capable of transmitting and receiving packets of data having an energy level $>E_1$ modulated upon a carrier in a uniquely assigned corresponding time slot in a plurality of N time slots forming, together with a synchronizing header, a TDMA frame, each packet of data being transmitted or received from a given TDMA station during said uniquely assigned time slot and wherein at least some of said time slots are being utilized during less than 100% of the available time, a circuit for utilizing the unused time in said time slots comprising:

a plurality of random access terminals (RATS), each capable of generating and transmitting a packet of data having an energy level $<E_2$ to any given single time slot during each frame and each comprising time slot selecting means for selecting said given single time slot on a predetermined statistical basis, and where $E_1$ is sufficiently greater than $E_2$ so that a data packet transmission from a TDMA will completely obscure a data packet transmission from a RAT; and each of said plurality of RATS further comprising means for receiving packets of data transmitted by any TDMA or any RAT and for verifying the successful or non-successful transmission of any data packet originating from said each RAT and for retransmitting any non-successfully transmitted data packet from said each RAT during a subsequent frame.

2. A circuit for utilizing unused time in time slots in a TDMA system as in claim 1, in which said time slot selecting means comprises second means for randomly selecting one of said N time slots in each frame in which a data packet is transmitted.

3. A circuit for utilizing unused time in time slots in a TDMA system as in claim 1, in which said time slot selecting means comprises means for selecting one of said N time slots in each frame in which a data packet is transmitted in accordance with the following expression:

$$P_i = \frac{1 - \rho_i}{\sum_{i=1}^{N}(1 - \rho_i)}$$

where $P_i$ is the time slot transmission probability of the $i^{th}$ time slot, N is the number of time slots, and $\rho_i$ is the estimated TDMA slot occupancy for the $i^{th}$ time slot.

4. A circuit for utilizing unused time in time slots in a TDMA system as in claim 1 and further comprising:

means for determining the percentage of successfully transmitted data packets per X consecutive frames, and in which said time slot selecting means comprises means for selecting one of said N time slots in each frame in which a data packet is transmitted in accordance with the following expression, and when said percentage of unsuccessfully transmitted data packets during said X frames exceeds a predetermined percentage;

$$P_i = \frac{\rho_i}{\sum_{i=1}^{N}\rho_i}$$

where $P_i$ is the time slot transmission probability of the $i^{th}$ time slot, N is the number of time slots in a frame, and $\rho_i$ is the estimated average TDMA slot occupancy for the $i^{th}$ time slot.

5. A circuit for utilizing unused time in time slots in a TDMA system as in claim 1 and further comprising:

means for determining when the number of successfully transmitted data packets per X number of frames lies below a given value A and for determining when the number of successfully transmitted data packets per X number of frames lies above a second given value B, where $X > B > A$ and in which said time slot selecting means is responsive to the determination that the number of successfully transmitted data packets is less than A to select one of said N time slots in each frame in which a data packet is transmitted in accordance with the following expression:

$$P_i = \frac{1 - \rho_i}{\sum_{i=1}^{N}(1 - \rho_i)}$$

and in which said time slot selecting means is responsive to the determination that the number of successfully transmitted data packets for X frames is between the values A and B to selecte one of said N time slots in each frame in which a data packet is transmitted in accordance with the following expression:

$$P_i = \frac{1}{N}$$

and in which said time slot selecting means is responsive to the determination that the number of successful data packet transmissions is greater than B for X frames to select one of said time N slots in each frame in which a data packet is transmitted in accordance with the following expression:

$$P_i = \frac{\rho_i}{\sum_{i=1}^{N}\rho_i}$$

where, for all of the above expressions, $P_i$ is the RAT transmission probability in the $i^{th}$ time slot, in a frame selected for transmission N is the number of time slots in a frame and $\rho_i$ is the estimated average TDMA slot occupancy for X frames for the $i^{th}$ time slot.

6. In a time division multiple access (TDMA) communication system, a plurality of TDMA stations each capable of transmitting and receiving packets of data at a first power level in a signal format having a synchronizing header followed by N time slots to form a frame, and with each data packet being transmitted or received from a given TDMA station duirng time slot uniquely assigned to a corresponding TDMA station, and wherein some of said time slots are being utilized less than 100% of the available time to thereby creat idle time in said time slots, and a plurality of random access terminals (RATS) each capable of transmitting data packets at a second power level less than said first level to a selected time slot in selected frames and for receiving all successfully transmitted data packets from any TDMA or from any RAT, a method of utilizing said idle time comprising the step of:

forming data packets at said RATS at said second power level for transmission to selected time slots in selected frames;

selecting, by predetermined statistical means a frame and a time slot in which to transmit said RAT originating data packets;

transmitting said RAT originating data packets in said selected frame and time slot;

determining occurrences of unsuccessfully transmitted data packets; and retransmitting such unsuccessfully transmitted data packets in subsequent frames.

7. A method as in claim 6 and comprising the further steps of:

determining the number of unsuccessfully transmitted data packets during each successive group of X frames;

determining the probability of TDMA slot occupancy $\rho$ for each time slot in each group of X frames;

determining the RAT slot transmission probability P for each time slot in said X frames;

determining the predetermined statistical means of selection of a given time slot when the average number of successful data packet transmissions per time slot with respect to the average number of data packets transmitted per time slot is less than a value A in accordance with the following expression;

$$P_i = \frac{1 - \rho_i}{\sum_{i=1}^{N}(1 - \rho_i)}$$

determining the predetermined statistical means of selection of a given time slot when the average number of successful data packet transmissions per time slot with respect to the average number of data packets transmitted per time slot is greater than a value A but less than a value B in accordance with the following expression; and $$P_i = \frac{1}{N}$$

determining the predetermined statistical means of selection of a given time slot when the average number of successful data transmissions per time slot with respect to the average number of data packets transmitted per time slot is greater than B in accordance with the following expression:

$$P_i = \frac{\rho_i}{\sum_{i=1}^{N}\rho_i}$$

where $P_i$ is the time slot transmission probability of the ith time slot, N is the number of time slots, and $\rho_i$ is the estimated TDMA slot occupancy for the $i^{th}$ time slot.

8. In a time division multiple access (TDMA) satellite transmission system comprising N TDMA stations and employing a signal format in which successive time frames begin with a header containing synchronizing and control signals generated by a selected TDMA and followed by N time slots, and with each TDMA generates and transmits data packets having a high energy level greater than X during a unique time slot assigned to said each TDMA and in which each TDMA receives data packets only during its assigned time slot and further in which the TDMA's do not transmit data packets in every available assigned time slot, thereby leaving unpredictably occurring idle time slots, a circuit for using a substantial portion of said idle time slots comprising:

a plurality of random access terminals (RAT's) each constructed to generate and transmit a data packet having an energy level less than to any given single time slot during each frame with means for selecting said given single time slot on a predetermined statistical basis, and where X is sufficiently greater than Y so that a data packet transmitted from a TDMA will completely obscure a data packet transmitted from a RAT;

each RAT comprising receiving means for receiving all successfully transmitted data packets and for determining the successful or non-successful transmission of any data packet originating therefrom; and means for retransmitting such non-successfully transmitted data packets during subsequent frames.

* * * * *